Figure 1:
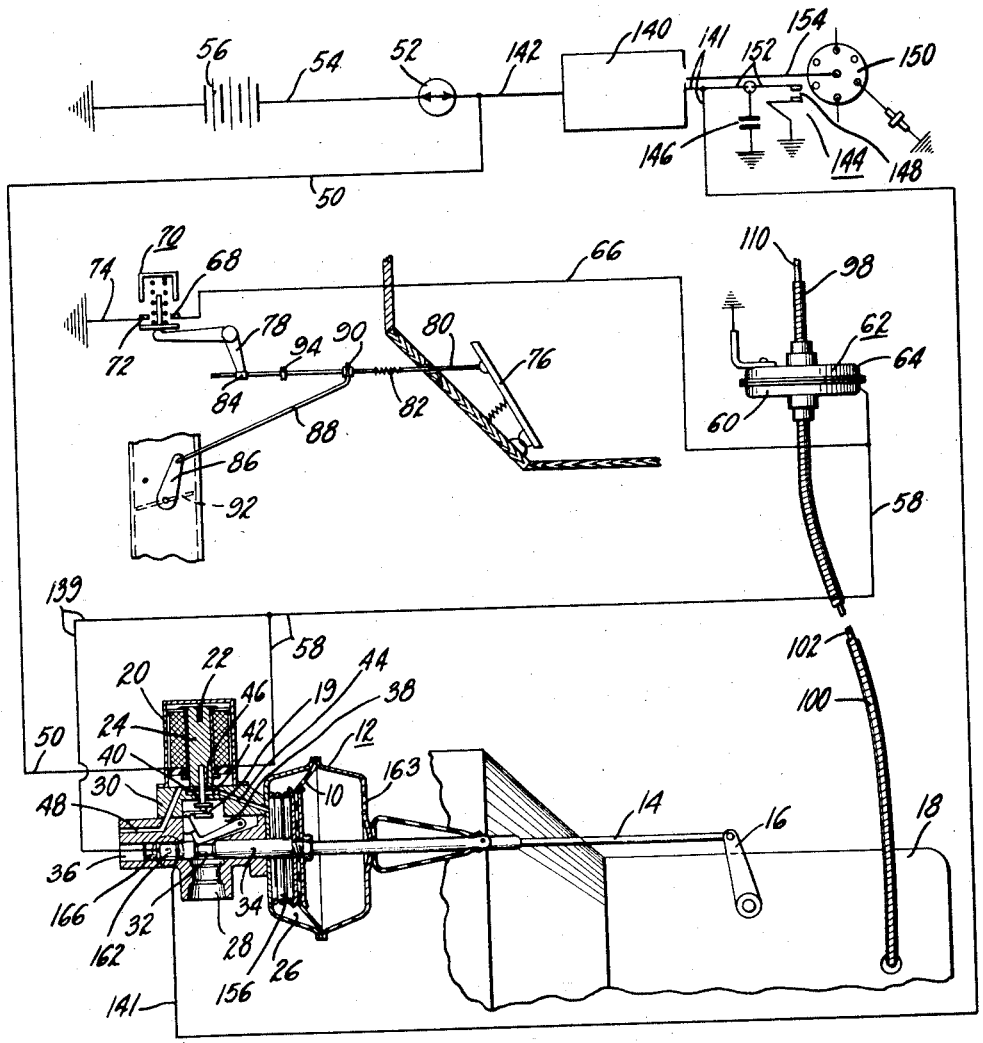

May 20, 1947.  H. W. PRICE  2,420,997

SWITCH MECHANISM

Filed Nov. 29, 1943

INVENTOR.
HAROLD W. PRICE
BY
H. O. Clayton
ATTY.

Patented May 20, 1947

2,420,997

UNITED STATES PATENT OFFICE 2,420,997

SWITCH MECHANISM

Harold W. Price, South Bend, Ind., assignor to Bendix Aviation Corporation, South Bend, Ind., a corporation of Delaware Application November 29, 1943, Serial No. 512,163

1 Claim. (Cl. 200—80)

This invention relates in general to switch mechanisms and in particular to a centrifugally operated breaker switch which may be used for controlling a transmission operating mechanism in an automotive vehicle.

One of the principal objects of my invention is to provide a very simple and compact breaker switch which may be incorporated in and therefore become a part of a flexible cable and conduit connection between the speedometer of an automotive vehicle and a movable part of the power plant of said vehicle, e. g. a part of the transmission.

Yet another object of my invention is to provide a centrifugally operated breaker switch including a movable contact member, e. g. a globule of mercury, the operation of which may be varied to thereby vary the difference between the speed at which the switch is made and the speed at which the switch is broken.

A further object of my invention is to provide, in an automotive vehicle provided with a change speed transmission which may be established in a relatively low gear or a relatively high gear setting and a kick-down transmission operating mechanism operable to establish the transmission in either one of said settings, means for controlling the operation of said mechanism including a vehicle speed responsive centrifugally operated mercury switch mechanism operative at a relatively low vehicle speed to effect a low gear operation of the transmission operating mechanism and further operative at a higher vehicle speed to effect a high gear operation of said transmission operating mechanism.

A further object of my invention is to provide a drive mechanism interconnecting the speedometer of an automotive vehicle with a vehicle speed responsive mechanism, e. g. a driven part of the change speed transmission of the vehicle, said drive mechanism having incorporated therein a centrifugally operated switch mechanism.

Yet another object of my invention is to provide a two-part drive mechanism interconnecting the speedometer of an automotive vehicle and a rotatable part of the power plant of the vehicle, the means for interconnecting the two parts of the drive mechanism constituting a centrifugally operated switch mechanism.

My invention in its broadest aspect contemplates the provision of a speedometer drive shaft having incorporated therein as a permanent part thereof a breaker switch mechanism for in part controlling the operation of a part of the power plant of the vehicle.

A further object of my invention is to provide a centrifugally operated switch mechanism which constitutes a part of the speedometer drive shaft of an automotive vehicle the parts of said shaft and mechanism being so constructed and arranged that the shaft may be temporarily disabled and the switch mechanism being readily repaired and serviced.

Other objects of my invention will appear more fully hereinafter from the following detailed description when taken in connection with the accompanying drawing, wherein one embodiment of the invention is illustrated. It is to be expressly understood, however, that the drawing is for purposes of illustration only and is not designed as a definition of the limits of the invention, reference being had for this purpose to the appended claim.

Figure 2:
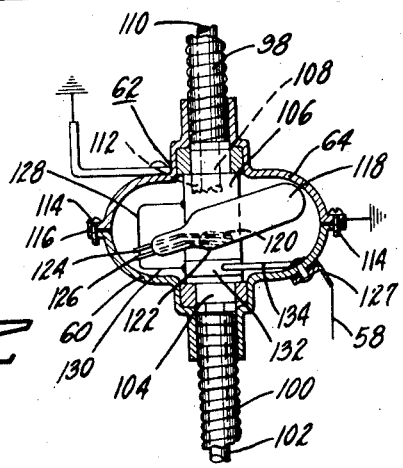

Figure 1 is a diagrammatic view disclosing the combined speedometer drive shaft and centrifugal breaker switch of my invention utilized as a part of the means for controlling the operation of a change speed transmission operating mechanism, said mechanism including a spring and vacuum operated motor which is shown in section; and Figure 2 is a sectional view disclosing the details of the switch mechanism of my invention.

Referring now to Figure 1 diagrammatically disclosing my invention utilized as a part of the means for controlling a transmission operating mechanism the power element 10 of a spring and pressure differential operated motor 12 is operably connected by a link 14 to a transmission operating crank 16. This crank is rotated either clockwise or counterclockwise to establish a change speed transmission 18 in gear. The means for controlling operation of the motor 12 includes a three-way valve 19 which is actuated by a solenoid 20 and a spring 22 interposed between the top of the casing of said solenoid and the armature 24 thereof. When the solenoid 20 is deenergized a spool shaft end portion of the three-way valve is moved downwardly by the spring 22 to provide an air transmitting connection between the intake manifold of the internal combustion engine and a compartment 26 of the motor 12; and when the solenoid 20 is energized, said spool shaped portion, which is connected to the armature 24, is moved upwardly to connect the chamber 26 with the atmosphere. As disclosed in Figure 1 the aforementioned vacuum connection is effected by a vacuum port 28 in the two-part valve casing 30, a recess 32 in a rod 34 connected to the power element 10 of the motor 12 and slidable within a recess 36 in said valve casing, a chamber 38 in said casing, an opening 40 in said casing, a chamber 42 to said casing and a duct 44 in said casing; and the aforementioned connection between the atmosphere and the chamber 26 is effected by the port 40, chamber 42, an opening 46 in the valve casing and a duct 48 therein.

Describing now the electrical means for controlling the operation of the three-way valve 19 the latter is connected by a wire 50 with the ignition switch 52 of the standard ignition system of the car; and said switch is connected by a wire 54 with a grounded battery 56. The solenoid 20 is also connected, by a wire 58, with one part 60 of a two-part casing of a centrifugally operated mercury switch 62 constituting the most important feature of my invention. The other part 64 is, as disclosed in Figure 2, grounded thereby completing an electric circuit, when the switch 62 is closed, between the grounded switch and grounded battery. As disclosed in Figure 1 a wire 66 interconnects the wire 58 with a fixed contact 68 of an accelerator operated breaker switch 70; and a fixed contact 72 is connected to a grounded wire 74. The accelerator 76 of the car is connected to a bell crank lever 78 by means of a rod 80 having a spring 82 incorporated therein. The outer end of the rod 80 is slidable through an opening in the end portion 84 of the lever 78 and the rod is connected to a throttle operating arm 86 by means of a link 88 fixedly connected at 90 to said rod. When the accelerator is depressed to opening throttle valve 92 the spring 82 remains solid, that is, said spring is not compressed; and after the accelerator has been depressed to sufficiently open the throttle a continued depression of the accelerator serves, by means of a stop 94 fixedly connected to the rod 80, to rotate the lever 78, thereby moving the movable contact 96 of the switch 70 into engagement with the fixed contacts 68 and 72 of said switch. Any further depression of the accelerator results in a compression of the spring 82.

Describing now the principal feature of my invention, that is the combined centrifugally operated switch mechanism 62 and drive between the speedometer of the car and the transmission, a flexible conduit 98 is preferably connected to the casing of the speedometer and a flexible conduit 100 is connected to the casing of the transmission. At this juncture, however, it is to be noted that the conduit 100 might be connected to any rotatable part of the power plant of the vehicle the rate of movement of which is directly proportional to the speed of the vehicle. A flexible cable 102, housed within the conduit 100, is drivably connected at one of its ends to the aforementioned part e. g. a movable part of the transmission the speed of said part being directly proportional to the speed of the vehicle; and said cable is fixedly connected at its other end to an end portion 104 of a cylindrically shaped member 106. The latter member is, of course, of an electrically conductive material. The upper end of the member 106 is provided with an opening to receive the lower end portion 108 of a cable 110 housed within the conduit 98 and connected at its upper end to the speedometer mechanism. A key member 112, preferably detachably mounted in the end portion 108 of the cable 110, also fits within a portion of the aforementioned opening in the upper end of the driven member 106. The tubular end portions of the switch casing members 60 and 64 are, as disclosed in Figure 2, fixedly connected to the conduits 100 and 98 respectively and said members are detachably secured together by suitable fastenings 114 preferably spaced apart by a gasket 116 of suitable insulating material. The two-part casing member may be detachably secured to a portion of the chassis of the vehicle or a part connected thereto.

Completing a description of the switch mechanism a hollow container 118, preferably of glass, is adjustably mounted, by any suitable means not shown, upon the member 106 and within the member 118 there is housed a globule of mercury 120 which rests upon a seat 122 when the member 106 is at rest. This globule of mercury of course constitutes the centrifugally movable contact member of the switch mechanism and when said globule is in the position disclosed in Figure 2, that is when the member 106 is at rest, the ends of contact members 124 and 126 are embedded within the mercury. Wires 128 and 130 serve respectively to interconnect the members 124 and 126 with the member 106 and a slip ring 132 mounted on the member 106; and when the switch 62 is closed a contact brush 134, secured to the casing 60 by a fastening 127, completes the electric circuit between the grounded casing part 64 and the wire 58 said wire as previously described being connected to the solenoid 20. It is to be noted here that the electrical ground connection is completed both through the grounded casing part 64 by virtue of its contact with the member 106 and through the cable 110 which is in all probability grounded at the speedometer.

Describing now the remainder of the mechanism disclosed in Figure 1 the breaker or so-called ignition interrupter switch 162 operated by the rod 34 is connected by a wire 139 with the wire 58 and by a wire 141 with the primary coil of the ignition coil 140 of the ignition system of the car; and this primary coil is connected by a wire 142 with the wire 50 which is connected to the ignition switch 52. The conventional distributor of the ignition system, which is indicated in general by the reference numeral 144, includes of course a grounded condenser 146, a breaker switch 148 and a rotor 150 wired to the several grounded spark plugs only one of which is shown. The primary coil of the ignition coil 140 is connected by a portion of the wire 141 and a wire 152 with the breaker switch 148 and the secondary coil of the ignition coil is connected by a wire 154 with the rotor 150.

Describing now the operation of the previously described mechanism it will be assumed that the engine is idling and the car is at a standstill. The accelerator being then released it follows that the switch 70 is open however the centrifugal switch 62 is at the time closed inasmuch as the member 106 is not rotating; for when the member 106 and the container 118 connected thereto are not rotating the globule of mercury 120 is positioned as disclosed in Figure 2 thereby closing the switch 62. Now when the switch 62 is closed the solenoid 20 is energized thereby moving the valve member 19 upwardly to uncover the port 46 and vent the chamber 26 to the atmosphere. A spring 156 within the motor 12 then functions to rotate the crank 16 clockwise to thereby establish the transmission in its so-called kickdown or relatively low gear ratio setting.

The transmission having been established in its low gear setting the accelerator is depressed to open the throttle to get the vehicle under way.

At this juncture it is to be noted that with the mechanism disclosed in Figure 1, that is a power plant of a conventional automotive vehicle including a friction clutch and a fluid clutch, there is no need, when the vehicle is in motion, to disengage the friction clutch of the vehicle prior to an operation of the power means in shifting the transmission from the low gear setting to the high gear setting or from the latter setting to the low gear setting. The latter operation is however facilitated by the operation of the ignition interrupter mechanism disclosed in Figure 1 and which mechanism is described in detail hereinafter.

When the car speed has increased to a certain factor the globule of mercury is moved outwardly by centrifugal force sufficiently to leave the fixed contacts 124 and 126 of the switch mechanism thereby breaking said switch; and the resulting deenergizing operation of the solenoid 20 results in a movement of the armature 24, and the valve member 19 connected thereto, downwardly by the expansion of the spring 22. The chamber 26 of the motor 12 is thus connected to the intake manifold and when the accelerator is sufficiently released after the desired vehicle speed is attained, there is provided by the intake manifold a source of vacuum to again energize the motor 12 this energization resulting from the differential of pressures to which the power element 10 of the motor is subjected; for a chamber 160 of said motor is at all times vented to the atmosphere via an opening 163 in the casing of said motor. The latter energization of the motor 12 results in the crank 16 being moved counter-clockwise to the position disclosed in Figure 1, thereby establishing the transmission in a higher gear ratio or a so-called upshift setting; and this vacuum operation of the motor 12 also results in a compression of the spring 156 thereby preparing the motor for its subsequent spring operation by said spring to establish the transmission in its low gear or kickdown setting. At this juncture it is to be noted that when the motor 12 is energized by vacuum a small bodied portion 32 of the rod 34 is positioned opposite the switch 162 thereby permitting the same to open.

Transmission 18 having been established in the higher gear ratio setting by releasing the accelerator the vehicle speed being then at or above a factor necessary to open the centrifugal switch 62, the driver will then depress the accelerator to maintain the desired vehicle speed. Should the driver wish to pass a car on the road this operation is facilitated by fully depressing the accelerator thereby fully opening the throttle and closing the switch 70. The solenoid 20 is thus energized thereby operating the valve 19 to again vent the chamber 26 of the motor 12 to the atmosphere. The motor 12 is then again energized, by an expansion of the spring 156, to effect a counter-clockwise movement of the crank 16 and again establish the transmission 18 in its low gear setting. This operation of the transmission is facilitated by a so-called torque reversal operation of the internal combustion engine; for with the first increment of movement of the power element 10 of the motor and the rod 34 connected thereto there results a closing of switch 162. This switch 162 is connected to the then closed accelerator operated switch 70. In this operation a full bodied portion 166 of the rod 34 comes in contact with a switch operating movable element for example a ball member not shown. It follows therefor that the closing of the switch 162 results in a completion of an electric ground connection to the breaker switch 148 the current flowing from the primary coil to the breaker switch being then appreciably reduced in fact so reduced as to disable the distributor and cut the engine system out of operation. This disabling of the ignition system results of course in a cutting off of the internal combustion engine, which operation, that is a so-called reversal of the engine torque, facilitates the aforementioned low gear operation of the transmission including a demeshing of the gears thereof establishing the transmission in high gear. This disabling operation of the engine is however only momentary inasmuch as after the rod 34 has moved a very short distance the switch 162 is again opened; for when the full bodied portion 166 of the rod 34 moves to the right, Figure 1, out of contact with the movable switch operating member then the said switch automatically opens.

The parts of the mechanism are preferably so constructed and arranged that the momentary disabling of the ignition system facilitates the demeshing operation of the transmission and the operation of the synchronizer of the transmission in preparing for the meshing of the gears to establish a low gear setting of the transmission.

There is thus provided, by the combined speedometer drive and centrifugal switch mechanism of my invention, a simple, effective, and easily serviced means for in part controlling the operation of a transmission operating mechanism known in the art as a kickdown mechanism.

The speedometer drive means of my invention is in two parts, the centrifugal switch mechanism being located at the juncture of said parts. The mounting of the container 118 on the speedometer driving part 106 may be changed; and this resulting change in angularity of said container with a resulting change in the shortest distance between the center of mass of the mercury globule and the longitudinal axis of the member 106, serves to change the vehicle speed at which the switch is broken. The adjustment is of course such that the center of mass of the mercury globule may never be placed at dead center that is in the aforementioned longitudinal axis of the member 106; for with the globule in this position the switch could not be broken.

It will also be noted that the switch 62, by virtue of the operative positions of the mercury globule that is either at the upper end of the container 118 or nested in the recess therein, is made at a lower car speed than the speed at which said switch is broken. This is particularly advantageous when the mechanism of my invention is utilized to control the kickdown mechanism described above and disclosed in Figure 1. For it is desirable to effect the low gear, that is kickdown spring operation of the motor 12 at a relatively low car speed and to effect the vacuum upshift operation of the motor 12 at a relatively high car speed.

Although this invention has been described in connection with certain specific embodiments, the principles involved are susceptible of numerous other applications that will readily occur to persons skilled in the art. The invention is, therefore, to be limited only as indicated by the scope of the appended claim.

I claim:

A combined switch and coupling unit adapted to be incorporated as a part of a rotatable drive shaft, said unit including an electrically grounded cup shaped casing member having tubular shaped base portion adapted to receive a conduit member, another cup shaped casing member having a tubular shaped base portion adapted to receive a conduit member, fastening means for detachably securing said cup shaped members together at their peripheral edges, said edges being separated by a gasket of electrical non-conductive material, a conduit member housed within the first mentioned tubular shaped base portion, a cable member housed within the latter conduit member, a conduit member housed within the second mentioned tubular shaped base portion, a cable housed within the latter conduit member, a switch support means connected to the latter cable and housed within the compartment provided by the two interconnected cup shaped casing members, means for drivably connecting the switch support means with the end of the first mentioned cable member, a switch housing member adjustably mounted on the switch support means, two fixed contact members housed within the switch housing member, a movable contact member within the switch housing member, said contact member adapted to be moved into contact with or away from the aforementioned two fixed contact members depending upon the rate of angular movement of the switch housing member, an electrical conductor interconnecting one of said fixed contact members and the switch support means, a slip ring mounted on the switch support means, a contact brush mounted on the second mentioned casing member and in contact with the slip ring and an electrical conductor member electrically connected with the brush member.

HAROLD W. PRICE.

REFERENCES CITED

The following references are of record in the file of this patent:

UNITED STATES PATENTS

| Number | Name | Date |
| --- | --- | --- |
| 2,292,253 | Thurber | Aug. 4, 1942 |
| 2,257,674 | Dunn | Sept. 30, 1941 |
| 2,277,800 | Syrovy | Mar. 31, 1942 |
| 2,279,999 | McKechnie | Apr. 14, 1942 |
| 2,333,668 | Neracher et al. | Nov. 9, 1943 |
| 1,790,330 | Smith | Jan. 27, 1931 |
| 2,098,226 | Charter | Nov. 9, 1937 |
| 2,173,543 | Thomas | Sept. 19, 1939 |
| 2,233,900 | Rowe | Mar. 4, 1941 |
| 2,029,632 | Moore | Feb. 4, 1936 |
| 2,359,623 | Coxon | Oct. 3, 1944 |